US007343309B2

(12) United States Patent
Ogawa et al.

(10) Patent No.: US 7,343,309 B2
(45) Date of Patent: Mar. 11, 2008

(54) METHOD AND SYSTEM FOR GENERATING INSURANCE PREMIUM QUOTES BY MULTIPLE INSURANCE VENDORS IN RESPONSE TO A SINGLE USER REQUEST

(75) Inventors: Masaki Ogawa, Zama (JP); Takeo Kono, Tokyo-to (JP); Hiroyuki Shimada, Kawasaki (JP); Yoshiyuki Nakai, Funabashi (JP); Muneaki Machida, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 1213 days.

(21) Appl. No.: 09/795,824

(22) Filed: Feb. 28, 2001

(65) Prior Publication Data

US 2001/0023404 A1 Sep. 20, 2001

(30) Foreign Application Priority Data

Feb. 29, 2000 (JP) ............................. 2000-055044

(51) Int. Cl.
*G06Q 40/00* (2006.01)
(52) U.S. Cl. .................... 705/4; 705/2; 705/35; 705/38
(58) Field of Classification Search .................. 705/4, 705/26, 2, 35, 38; 709/219, 217
See application file for complete search history.

(56) References Cited

U.S. PATENT DOCUMENTS 5,655,085 A 8/1997 Ryan et al. .................... 705/4

| | | | | |
|---|---|---|---|---|
| 5,758,328 A | * | 5/1998 | Giovannoli | 705/26 |
| 5,890,129 A | * | 3/1999 | Spurgeon | 705/4 |
| 6,038,668 A | * | 3/2000 | Chipman et al. | 713/201 |
| 6,385,594 B1 | * | 5/2002 | Lebda et al. | 705/38 |

(Continued)

FOREIGN PATENT DOCUMENTS

WO WO91/20071 * 12/1991

OTHER PUBLICATIONS

Anonymous, "InsWeb Rolls out XML Interface for Marketplace partners", PR Newswire, No. 44549619, Sep. 9, 1999, 3 pages.*

(Continued)

*Primary Examiner*—Carolyn Bleck
(74) *Attorney, Agent, or Firm*—Schmeiser, Olsen & Watts; William H. Steinberg

(57) ABSTRACT

A system and method for permitting a consumer to compare premium estimates form a plurality of insurance providers based on inputting conditions which affect the premium calculation a single time to a network such as the Internet. A user initiates a session by connecting his computer to an insurance comparison website provided by a service underwriter. The user inputs various conditions which might affect the premium for a desired insurance product. The user inputs condition data to condition input screen and sends the condition data to the service underwriter. The service underwriter converts the condition data into a form suitable for a standard interface and sends the formatted data to computers of one or more participating and user selected insurance companies or underwriters. A premium calculation engine at the computer for each insurance company calculates an estimated premium. This, and other pertinent insurance policy data, is displayed to the user.

20 Claims, 15 Drawing Sheets

U.S. PATENT DOCUMENTS

| | | | | |
|---|---|---|---|---|
| 6,559,862 | B1* | 5/2003 | Nakazawa | 715/738 |
| 6,615,253 | B1* | 9/2003 | Bowman-Amuah | 709/219 |
| 6,898,597 | B1* | 5/2005 | Cook et al. | 707/10 |
| 7,107,325 | B1* | 9/2006 | Krish | 709/220 |
| 2002/0026334 | A1* | 2/2002 | Igoe | 705/4 |

OTHER PUBLICATIONS

Anonymous, "QuickenInsurance Makes Comparisons and Choices Easier with New Quotes Summary Redesign", Business Wire, No. 45904016, Oct. 29, 1999, 4 pages.*

Anonymous, "eLEC Communications Corp.'s affiliate, RiderPoint, inc., announces expansion of its comparative insurance rater, RiderPoint IQ, to Indiana and Wisconsin", Business Wire, No. 4677037, Dec. 1, 1999, 3 pages.*

Anonymous, information found at the web site of QuickenInsurance, Jan. 27, 1999, 8 pages.*

Anonymous, "InsWeb rolls out XML interface for Marketplace Partners", PR Newswire, Sep. 9, 1999, No. 44549619, 3 pages.*

InsureMarket (Quicken Insuremarket, accessed from archive.org, see http://web.archive.org/web/19981212025934/http://www.insuremarket.com, dated 1998-1999 (hereinafter "Insuremarket")).*

T.Otake, "Insurance Square Bang!" Broker Business Is Realized by Web, Distance Even With 50 Severe Percent Even of Conclusion. Nikkei Multimedia, Nikkei Business Publications, Inc., No. 46, pp. 86-89, Apr. 15, 1999.

EcoSeminar2, Newest Trend Of The U.S. Insurance Industry(3), Weekly Economist Mainichi Newspaper, vol. 76, No. 50, pp. 94-95, Nov. 17, 1998.

"Nonlife Insurance Sales Internet Site, Estimate to Several Companies Is Possible", Nikkin, The Japan Financial News Co. Ltd., Nov. 20, 1998.

O.Kouno, "7 Articles for Surviving The 21$^{st}$ Century-DOTCOM Company Winner's Conditions", Nikkei Business Publications Inc., No. 55, pp. 56-69, Jan. 15, 2000.

* cited by examiner

Form3 http://www.ibm.com

Estimation Service for Automobile Insurance on Internet

Step 1→ ●Step 2→ ●Step3→ .
→ ●Step4→ ●Step 5→ ●Step6

- Before Estimation
  Please indicate below whether you meet these requirements:

- Eligible Person
  1) Licensed Driver

2) No recent accidents

3) License not suspended

4) At least 25 years old

5) Not a commercial driver

If you meet all requirements, please press "Yes".
If you don't, please press "No".
In case you press "No", you can request special estimate.

10 —[ Yes ]          [ No ]— 11

FIG. 6

```
Form3                                                    _ ☐ ✕
┌─────────────────────────────────────────────────────────┐
│ http://www.ibm.com                                      │
├─────────────────────────────────────────────────────────┤
│                                                         │
│       Estimation Service for Automobile Insurance on Internet
│       ─────────────────────────────────────────         │
│              Step 1→ ●Step 2→ ●Step3→ .                 │
│              → ●Step4→ ●Step 5→ ●Step6                  │
│                                                      14 │
│   ● Please input your car's information.                │
│  ┌─────────────────────────────────┬──────────────┐     │
│  │ ● Please select car year.       │ 2001       ▼ │     │
│  ├─────────────────────────────────┼──────────────┤     │
│  │ ● Please select manufacturer name.│ Audi      ▼ │     │
│  └─────────────────────────────────┴──────────────┘     │
│                                                      15 │
│              ┌──────┐    ┌────┐                         │
│              │Return│    │Next│                         │
│              └──────┘    └────┘                         │
│                 17         16                           │
│                                                         │
└─────────────────────────────────────────────────────────┘
```

FIG. 7

```
Form3                                              _ □ ×
┌─────────────────────────────────────────────────────┐
│ http://www.ibm.com                                  │
└─────────────────────────────────────────────────────┘

Estimation Service for Automobile Insurance on Internet
        ─────────────────────────────────────────────
              Step 1→ ●Step 2→ ●Step3→ .
              → ●Step4→ ●Step 5→ ●Step6
        ─────────────────────────────────────────────
   ● Please input your car's information.
   ┌──────────────────────────────┬──────────────────┐
   │ ● car year                   │ 2000             │
   ├──────────────────────────────┼──────────────────┤
   │ ● manufacturer name          │ Nissan           │
   ├──────────────────────────────┼──────────────────┤
   │ ● Please select automobile name │ Altima      ▼ │
   └──────────────────────────────┴──────────────────┘
                  [Return]   [Next]           18
```

FIG. 8

| | Select | Type | Features | Style |
|---|---|---|---|---|
| 19 | ○ | GE | Standard Pkg | 4 Door |
| | ○ | GE | Touring Pkg | 4 Door |
| 19 | ○ | XE | Standard Pkg | 4 Door |
| | ○ | XE | Touring Pkg | 4 Door |
| 19 | ○ | XLE | Standard Pkg | 4 Door |
| | ○ | XLE | Touring Pkg | 4 Door |

Form3 — http://www.ibm.com

Estimation Service for Automobile Insurance on Internet

Step 1→ ●Step 2→ ●Step3→ .
→ ●Step4→ ●Step 5→ ●Step6

● Please input your car's information.

| car year | 2000 |
|---|---|
| manufacturer name | Nissan |
| automobile name | Maxima |

● Please select your car from the list.

FIG. 9

```
Form3                                                    _ □ X
http://www.ibm.com Estimation Service for Automobile Insurance on Internet
              Step 1→ ●Step 2→ ●Step3→ .
              → ●Step4→ ●Step 5→ ●Step6
    ● more detailed information...

● When was the first registration?        | 2001▼ JAN▼ 01▼ |

● ABS equipped?                           | ○Yes  ○No      |

● Airbag equipped?                        | ○Yes  ○No      |

● Current member of non-fleet class?      | 2▼ class       |

[Return]    [Next]
```

FIG. 11 http://www.ibm.com

- Please select estimation plan.

| | A Plan | B Plan |
|---|---|---|
| Please Select | ○ | ○ |
| Plan Name | Standard | Deluxe |
| Deductible | $500 | $250 |
| Towing | $150 | $150 |
| Liability | $100,000/$300,000 | $250,000/$500,000 |
| Comprehensive | NO | YES |
| Rental car | NO | YES |
| Uninsured Motorist | NO | YES |
| Collision | NO | YES |
| Medical | $20,000 | $50,000 |

- Please select insurance companies to request estimation

| A | B | C | D | E | F |
|---|---|---|---|---|---|
| ☑ | ☑ | ☑ | ☐ | ☐ | ☐ |

[Return] [Next]

```
Content-type: application/x-www-form-urlencoded
Content-length: 44 siki=19991223&manki=20001223&shubetu=1&...
```

(b)

```
HTTP/1.1 200 OK
Date: Fri, 04 Feb 2000 04:20:12 GMT
Server: Apache/1.3.3 (Unix) (Red Hat/Linux)
Connection: close
Content-Type: text/plain

| | | |
|---|---|---|
| http://www.ibm.com | | |

If you request estimation to create comparison table...   [Execute] *25*

[Return] *23*

*22*                                                    *24*

A

| Plan Name | Yearly Premium |
|---|---|
| Standard | $1000.00 |

Assumptions:
- No drivers under 25

- No points on license

- No commercial activity

B

| Plan Name | Yearly Premium |
|---|---|
| Standard | $950.00 |

C

| Plan Name | Yearly Premium |
|---|---|
| Standard | $875.00 |

FIG. 14 http://www.ibm.com

Detailed Comparison Table

- Estimation Conditions

| Car Data | | | | |
|---|---|---|---|---|
| Policy Details: 6/1/2001 through 5/31/2002 | | | | |
| Make | Model | ABS | Driver Airbag | Side Airbag |
| Nissan | Maxima | Yes | Yes | Yes |
| Year | Type | Style | | |
| 2000 | LE | 4 Door | | |
| Policy Details | | | | |
| Policy Name | Deductible | Towing | Uninsured Motorist | Liability |
| Standard | $500.00 | $150.00 | Yes | $100,000/ $300,000 |
| Collision | Comprehensive | Rental Coverage | Multi-car Discount | Good Driver Discount |
| Yes | Yes | Yes | Yes | Yes |
| Medical | | | | |
| $10,000 | | | | |

- Estimation Results

| Company | Company A | Company B | Company C |
|---|---|---|---|
| Policy Name | Standard | Standard | Standard |
| Yearly Premium | $1000.00 | $950.00 | $875.00 |
| | Requirements: -All drivers over age 25 | | |

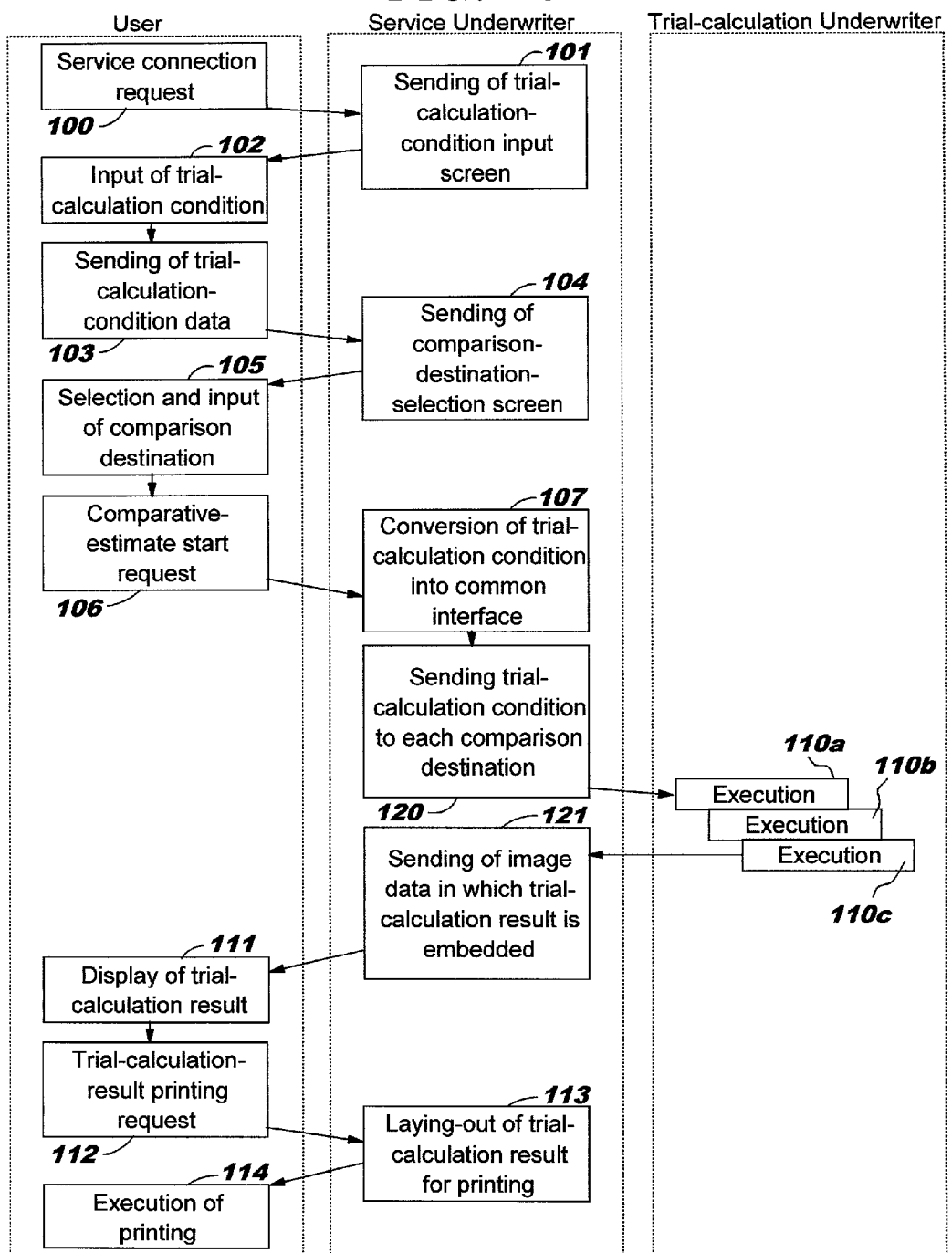

METHOD AND SYSTEM FOR GENERATING INSURANCE PREMIUM QUOTES BY MULTIPLE INSURANCE VENDORS IN RESPONSE TO A SINGLE USER REQUEST

BACKGROUND OF THE INVENTION

1. Field of the Invention

The present invention relates to technique which permits prospective insurance buyers to obtain premium estimates from a premium trial-calculation system, a computer system, and a medium, particularly to an art to be effectively applied to a comparative estimate (trial calculation) for a plurality of companies.

2. Description of the Related Art

Even with recent advancements in computer networks like the Internet, it remains relatively difficult to obtain quotes for insurance products from multiple vendors that can be easily compared. For example, in the case of an insurance commodity (or insurance service) to which comparatively-standardized insurance condition can be applied such as automobile insurance, similar insurance commodities are provided from a plurality of companies. A user or consumer makes a purchase decision by comparing insurance coverage and premiums from various companies.

A user has conventionally obtained the information about coverage and premiums of insurance commodities from advertisements or direct business activities by insurance companies or insurance agents, many of whom are tied to a single insurance company. However, because of the advancement of information technology such as the Internet, consumers have been gradually able to obtain more and more information about insurance commodities. For example, the web sites of some insurance underwriters provide functions for performing trial calculation (estimation) of insurance commodities and their charges. Thus, a customer is able to know a premium corresponding to an insurance condition of the customer by accessing home pages of the underwriters.

However, at the web site of each company, it is possible to only calculate the premium for an insurance commodity provided by the underwriter who manages the web site. Therefore, to compare commodities of various companies, it is necessary to individually access the web site of each company.

Accordingly, an object of the present invention is to provide a technique capable of permitting a user to compare insurance commodities (insurance service offerings) of a plurality of companies by inputting conditions which effect the insurance premium a single time.

Another object of the present invention is to provide insurance commodity information and nearly real time quotes as directly supplied from a plurality of companies.

Another object of the present invention is to provide consumers with high quality insurance commodity information from multiple suppliers via a comparatively simple system.

SUMMARY OF THE INVENTION

The following is the outline of the present invention. The present invention provides trial calculation of insurance premiums using a computer system and/or a computer network. A screen or graphical user interface (GUI) for inputting trial-calculation conditions and a screen or GUI for selecting insurance underwriters (insurance companies for which a comparison is desired) are provided to a consumer computer in response to a request by the consumer. A service underwriter's computer provides the input and selection screens. The service underwriter acts as a gateway between the consumer and the insurance companies. The consumer inputs the data necessary via the GUIs and the data is transmitted to the service underwriter's computer. The consumer's trial-calculation condition data is sent to the computers of the selected insurance underwriters (insurance companies or the like). The trial-calculation data, or conditions, can be sent using a number of techniques. First, the condition data can be sent directly from a service underwriter's computer to an insurance underwriter's computer. Alternatively, the data by can be sent by relating and embedding the address (URL or the like) of the web site of an insurance underwriter to and in the data for displaying a premium calculation result sent from a service underwriter to the customer's computer (trial-calculation result displaying data). The embedding can be executed by describing a simple program followed by the post of data with a language such as JavaScript in trial-calculation result display data. Moreover, relating of the address of an insurance underwriter to the trial-calculation result display data can be realized by relating the address to the frame of each insurance underwriter assigned to the display data. In this case, trial-calculation condition data is sent from a customer's computer to an insurance underwriter's computer.

The insurance underwriter's computer receives the condition data and estimates a premium for the insurance commodity suitable for the condition data. A trial-calculation result includes the estimated premium and is sent to the user's computer and displayed on the screen of the display unit of the user. A frame is assigned to each insurance underwriter in the display screen of the user. Accordingly, the user can simultaneously compare and examine terms and estimated premiums from a plurality of insurance underwriters (insurance companies) by inputting condition data relevant to the desired insurance product a single time.

Thus, the user can obtain premium estimates from a plurality of insurance companies by inputting relevant conditions once, thereby improving convenience. Moreover, results from these insurance underwriters are directly obtained from each insurance underwriter in real time, without referring to a data table obtained from each insurance underwriter and prepared by a service underwriter. Therefore, it is possible to compare and examine results in accordance with the latest updated data, quickly obtain the most accurate results possible, and permit the user to compare multiple offerings with minimal effort.

When the condition data is sent from a service underwriter, it is preferable that the data is converted into a format suitable for a common gateway interface (CGI). In this case, each insurance underwriter (insurance company) can use this system only by generating a data format suitable for the CGI and therefore, it is unnecessary to make an excessive investment. Moreover, it is possible to return results to a user's computer in HTML format through the CGI.

Not only are the results directly returned from an insurance underwriter to a user's computer as described above, but the results may also be temporarily collected in a service underwriter's computer and transferred from the service underwriter to the user's computer.

Moreover, it is possible to print the results using a printer, etc. In this case, it is possible to lay out a printing format so that the results for a plurality of insurance underwriters (insurance companies) are printed in a format in which they may easily be compared.

Furthermore, a service underwriter can improve the quality of service by recording a request from a user. For example, it is possible to change trial-calculation condition input screens or change insurance underwriter selection screens so as to display an insurance underwriter frequently selected by users at the top of a selection list or displaying a condition input items frequently designated by the user at a high position in a selection list. Moreover, when attributes such as the age and sex of a user can be determined, it is possible to improve the convenience of condition inputting for a user by changing input screens so as to display a display item corresponding to or optimized by an attribute at the top or high rank in a selection list.

BRIEF DESCRIPTION OF THE DRAWINGS

FIG. 4 is a display screen showing an example of service start when the insurance commodity is automobile insurance;

FIG. 6 is an example of an input screen for information about an automobile for which an insurance quote is desired;

FIG. 7 is an example of a second input screen for information about the automobile for which an insurance quote is desired;

FIG. 8 is an example of a third input screen for information about the automobile for which an insurance quote is desired;

FIG. 9 is an example of a fourth input screen for information about the automobile for which an insurance quote is desired;

FIG. 11 is a display screen showing an example of a comparison-destination selecting screen;

FIG. 12A is an example of trial-calculation condition data formatted in accordance with the x-form-encoded format;

FIG. 12B is a data list showing an example of a format of result data to be returned;

FIG. 13 is a display screen showing results from various companies;

FIG. 14 is an example showing the layout of a comparison table to be printed; and FIG. 15 is flowchart showing another example of a premium trial-calculation method of the present invention.

DESCRIPTION OF THE PREFERRED INVENTION

An embodiment of the present invention is described below in detail by referring to the accompanying drawings. However, it is possible to embody the present invention in many different modes. In the embodiment, the same components are provided with the same number.

In the case of the following embodiment, a method or system is mainly explained. However, as known by those skilled in the art, the present invention can be embodied as not only a method and a system but also as program code recorded in a medium which is usable by a computer. Therefore, the present invention can be implemented in a hardware a software embodiment, a combination of software and hardware. One of the following media can be used as a medium in which a program code is recorded: a hard disk, CDROM, optical memory device, magnetic memory device, etc., and any computer-readable medium including the hard disk, CD-ROM, optical memory device, magnetic memory device, etc.

Figure 1:
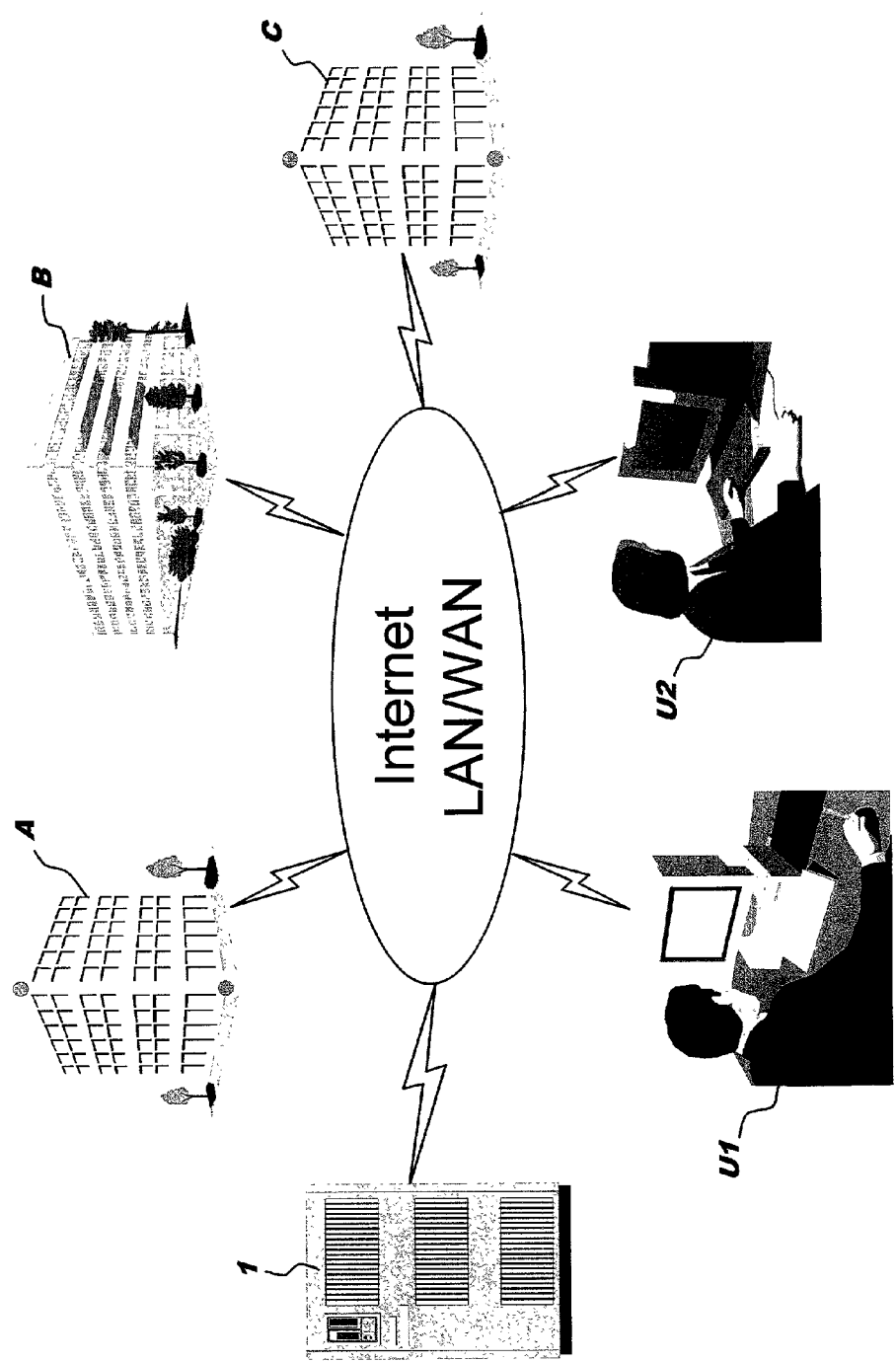
FIG. 1 is a conceptual illustration for explaining the environment of the present invention.

FIG. 1 is a conceptual illustration for explaining the outline of the present invention. The present invention describes a technique for calculating estimated insurance premiums which is mediated by a server 1 of a service underwriter. The server 1 is connected to the Internet or an appropriate network or the like. A customer, consumer, shopper or user U1 or user U2 connects to the server 1 via the Internet from a computer terminal and inputs a request for an insurance premium or rate quote from insurance companies A, B, and C. The user inputs conditions which are used by the insurance companies to calculate estimates or the premium. The insurance companies A, B, and C perform trial calculations corresponding to the trial-calculation conditions and return trial-calculation results. The returned trial-calculation results are displayed on the display screen of the a computer terminal of the user U1 or U2. Thus, the user U1 or U2 can compare and examine insurance products and estimated premiums of the companies as per the displayed trial-calculation results. Thus, the present invention makes it possible to obtain premium estimates of a plurality of insurance commodities based upon conditions that are input only once. Therefore, user convenience is improved by displaying the trial-calculation results so as to be easily comparable.

Figure 2:
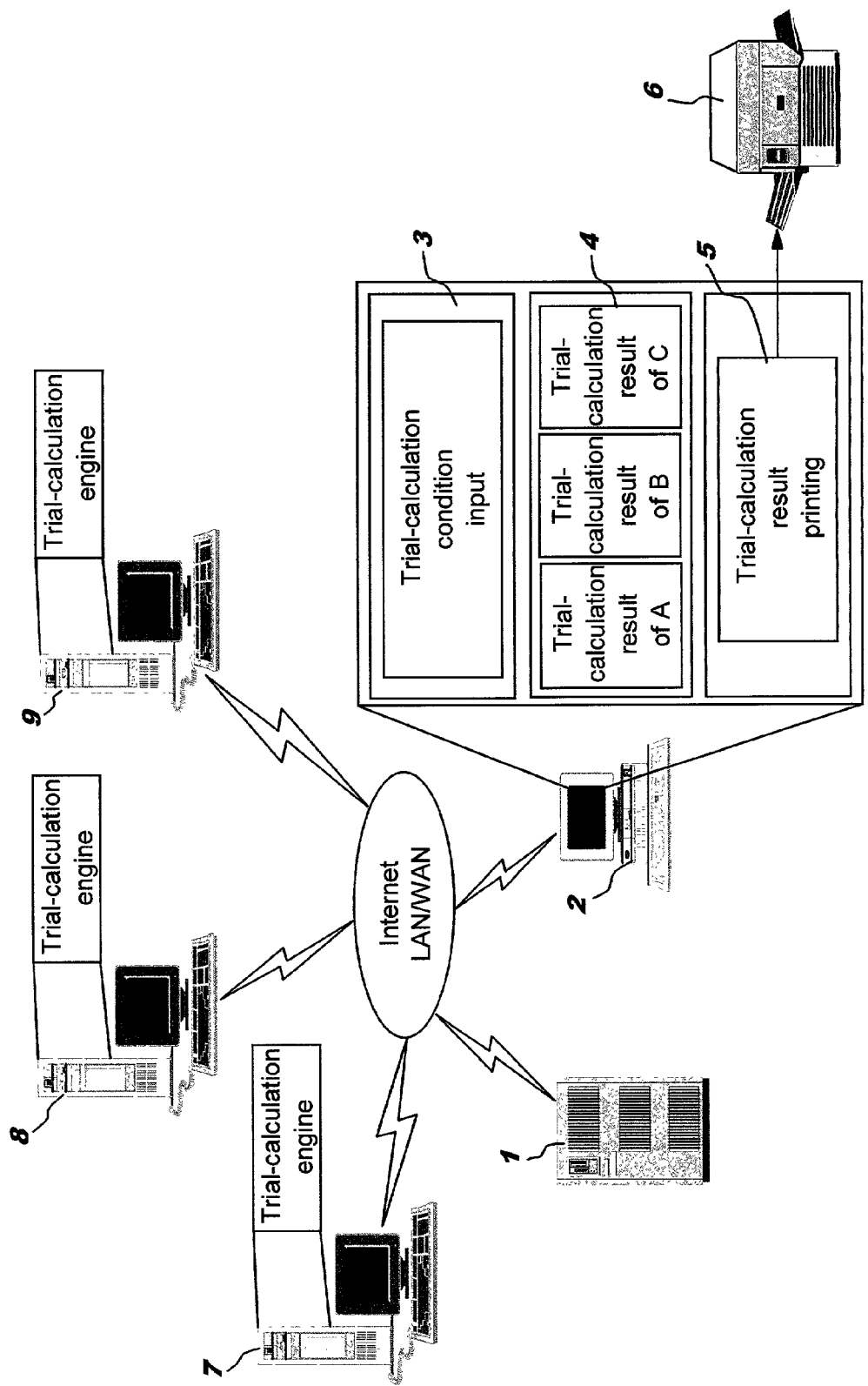
FIG. 2 is a conceptual illustration showing the outline of a trial-calculation system of the present invention.

FIG. 2 is a conceptual illustration showing the outline of a trial-calculation system of the present invention. The trial-calculation system of the present invention can use, for example, the Internet. It may also utilize a LAN, WAN or other network in addition to the Internet. As explained relative to FIG. 1, the service underwriter, users, and insurance companies (insurance underwriters) exchange data through their computers.

The server 1 of the service underwriter functions to send display document data, to be described later, in accordance with a service request from each client. The display document data is, for example, HTML (Hypertext Markup Language) format document data that is communicated by using a standard communication protocol such as HTTP (Hypertext Transfer Protocol).

A browser capable of displaying, for example, an HTML document is installed in a computer 2 of a user. The user's browser will display one of a number of screens. These include a trial-calculation condition input screen 3, a result display screen 4, and a print selecting screen 5 of. These display screens are returned as, for example, HTML-format display data from the server 1 of the service underwriter in accordance with a client request from the computer 2 and displayed by the browser in the computer 2 (client). When printing is selected through the print selecting screen 5, a printer 6 connected to the computer 2 is activated and the results are printed. A screen may also be provided for selecting comparison destinations (insurance underwriters such as the insurance companies A, B, and C in FIG. 1) in the trial-calculation condition input screen 3.

A trial-calculation engine (trial-calculation program) for each underwriter is installed in computers 7, 8, and 9, each of which corresponds to an insurance underwriter (insurance company). The number three is selected for the number of companies for illustrative purposes only. The number of companies is not restricted to three. The trial-calculation engine can be an engine independently developed in accordance with the specifications of each company and it is unnecessary to particularly develop a trial-calculation engine for the present invention. Therefore, the present invention can be simply realized without making much investment. However, because of an interface of data to be transferred between computers, it is necessary to construct these trial-calculation engines so as to be able to process data through a standard gateway interface (CGI). The CGI makes it possible to standardize the format of trial-calculation data and interface the standardized trial-calculation data with the trial-calculation engine intrinsic to each company. For example, it is possible to use the trial-calculation engine of each company only by posting standardized trial-calculation condition data through the CGI. It is possible to return a trial-calculation result in accordance with the HTML format by the CGI. In general, standardization of a data format by the CGI is easy compared to the development of a trial-calculation engine and it is possible to construct a high-convenience system for a user with a minimal development investment.

A computer (computer system) usable by the present invention has a central processing unit (CPU), main memory unit (RAM), nonvolatile memory unit (ROM), etc. which are connected to each other by a bus. Moreover, the bus connects with a coprocessor, image accelerator, cache memory, input/output control unit (I/O), etc. Furthermore, the bus connects with an external memory device, data input device, display device, communication controller, etc. through a proper interface. Furthermore, it is not necessary to say that it is possible to have a hardware resource generally provided to a computer system. Though a typical external memory device is a hard disk unit, the memory device is not restricted to the hard disk unit. The memory device may also be a semiconductor memory device such as a photo-magnetic memory device, optical memory device, or flash memory. A read-only memory device such as a CD-ROM that can be used only for data read is also included in the external memory device when it is applied only for data read or program read. A data input device can be provided with an input unit such as a keyboard and a pointing device such as a mouse. The data input device may also be a voice-input unit. Examples of a display device include a CRT, liquid-crystal display device, and plasma display device.

A LAN, WAN and the like can be used as a network in which a plurality of computer systems is connected with each other rather than using the Internet. It is also allowed to realize the present invention by using a LAN, WAN and the like. A communication line for connection of the computer systems can be either of a leased line and a public line. A computer system includes various types of computers such as a personal computer, workstation, and mainframe computer. The present invention can also be realized by a single computer system.

Moreover, it is unnecessary to record the data (such as display data) to be referred by the server 1 of the service underwriter in the server 1 as long as the data can be accessed by referring to the address from the server 1. That is, it is possible to dispersively process or execute some programs or data in the server 1 by the server 1 and some programs or data by a remote computer. It is possible to specify an address by using a DNS, URL and the like.

Furthermore, in this description, the term "Internet" includes intranets and extranets. Access to the Internet also represents an access to intranets or extranets. The term "computer network" includes a computer network that can be publicly accessed and a computer network that can be only privately accessed.

Figure 3:
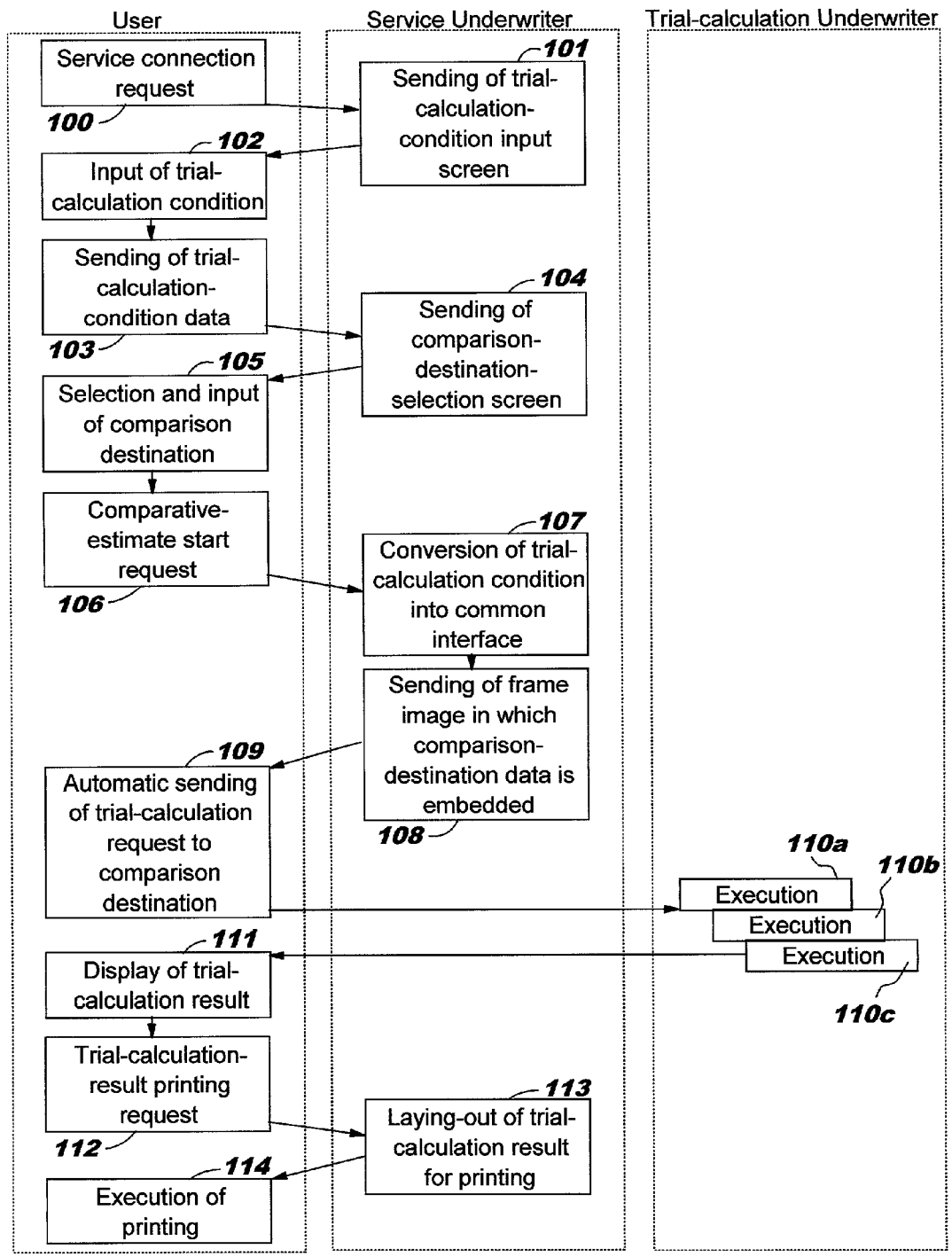
FIG. 3 is a flowchart showing an example of an insurance trial-calculation method according to the present invention.

The present invention is described below. More detailed configuration of the above system is disclosed in the following description of the present invention. FIG. 3 is a flowchart showing an example of a premium trial-calculation method of the present invention. In FIG. 3, tasks to be performed by computers of a user, service underwriter, and insurance underwriter are shown in separate columns. That is, the user's tasks are shown in the left column, the service underwriter's tasks are shown in the middle column, and the insurance underwriter's tasks are shown in the right column. The following embodiment of the present invention is described as a trial-calculation service when the insurance commodity is an automobile insurance policy. However, the present invention is not restricted to the following example.

First, a service connection request is issued from the user's computer (Step 100). Preferably, the service connection request is initiated by a user inputting the URL of the web site of a service underwriter to the browser.

FIG. 4 is an example initial display screen via which a user will initiate a request for an insurance estimate. For example, the screen may be an estimate request service start page of a service underwriter. A trial-calculation (estimation) service for an automobile insurance policy prompts a user to decide whether the terms of use of the service are acceptable on the start screen. The user reads terms of use on the start screen. If the user agrees to the terms of use, the user presses a button 10 for "Yes" and progresses to the next step. However, if the user chooses not to accept the terms, the user presses a "No" button 11 and processing ends. The display screen of the browser is the same as that of a general browser and is known to those skilled in the art. Therefore, detailed description is omitted.

Figure 5:
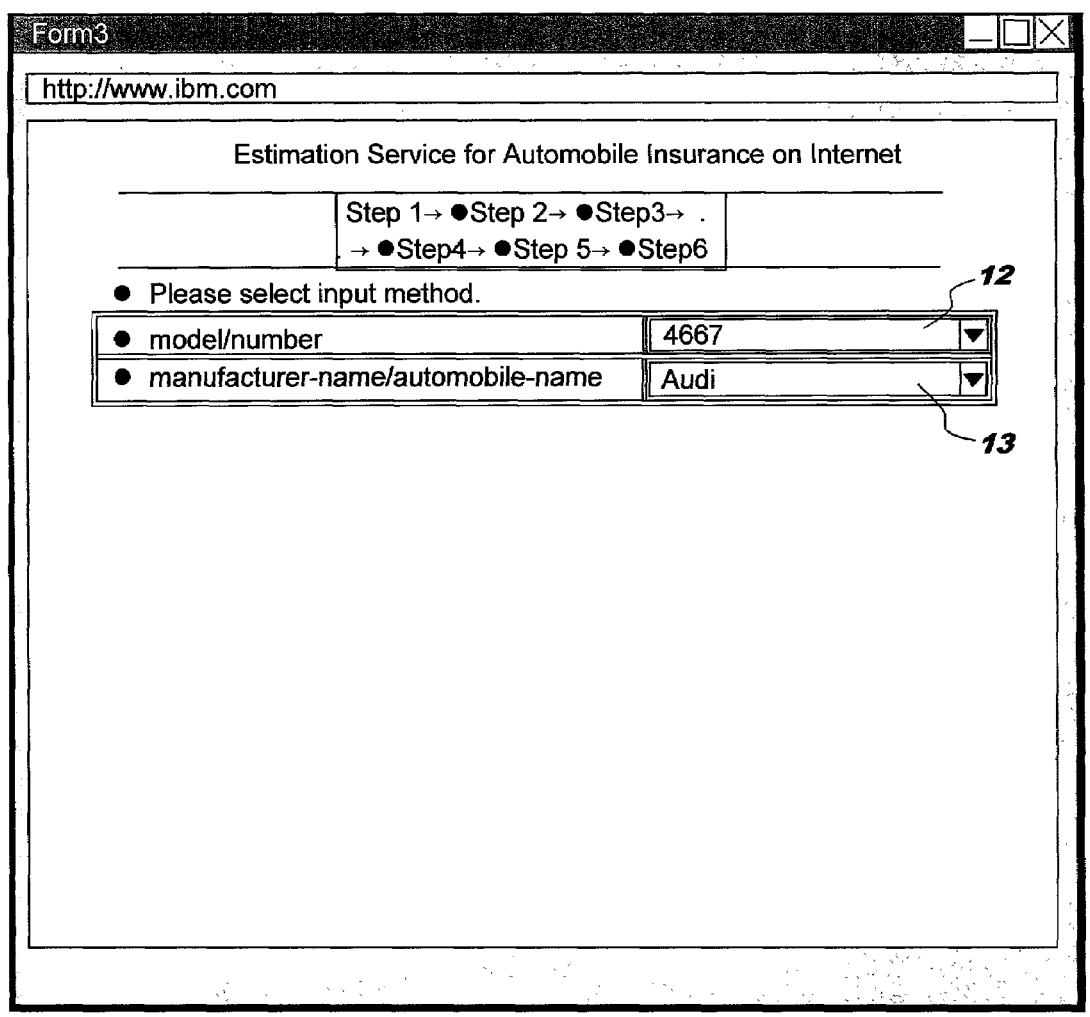
FIG. 5 is an example of a screen showing the condition-input-screen data sent from a service underwriter and displayed by the browser of a customer's computer.

If the user accepts the service conditions, a trial-calculation condition input screen is sent from the service underwriter (Step 101). FIG. 5 shows an example condition input screen data sent from the service underwriter to the browser of the user. In the preferred embodiment, the condition input screen is not one screen but is divided into a plurality of sub-screens as described below. However, it is also permitted to unite the sub-screens into one input screen as practical.

In the condition input screen in FIG. 5, the user inputs automobile-model and make information. In the preferred embodiment, a car type number input (button 12) or manufacturer and automobile model input (button 13) is selected. For this example, it is assumed that a manufacturer name and automobile name option is selected by the user selecting the button 13.

FIG. 6 shows an example input screen for information about the automobile for which a quote is desired. In this case, automobile information is specified in accordance with selection of a model year and selection of a manufacturer name. Number selection improves the convenience of the selection operation, in that a user selects a component box 14 and causes a selection prospect list of possible model years to be displayed. For example, "1994" or "2000" is selected. A manufacturer name is also selected by opening a list associated with a component box 15 and the selecting the appropriate manufacturer from the list. After the above selection operation, a "next" button 16 is pressed to proceed to the next step. It is possible to return to the preceding screen by selecting a "return" button 17. These buttons are provided for each subsequent screen downward, and descriptions of "next" and "return" are hereafter omitted.

FIG. 7 shows an input screen for additional information about the automobile for which an insurance estimate is desired. Preferably, a menu of automobile names is displayed. Since the year and manufacturer name were specified via the input screen in FIG. 6, the information about the year and manufacturer name are simultaneously displayed. Prospective automobile names are displayed based on the year and manufacturer name, which decrease the length of the list. In this case, an automobile name is selected by using a component box 18.

FIG. 8 shows another input screen for additional information. In this case, the information about a type is input. Since the year, manufacturer name, and automobile model name have already been specified, the year, manufacturer name, and automobile model name is simultaneously displayed. Moreover, a list of model types, such as "EX," "LX,", "4 door," "station wagon,", etc., is displayed in accordance with the information so that a type can be selected with a radio button 19. The user selects a "next" button (not illustrated) after selecting a type to progress to the next step.

FIG. 9 illustrates of an input screen for more detailed information about the automobile for which an insurance quote is desired. In this case, the year end month in which the car was first registered, presence or absence of ABS (antilock braking system) and air bags, and the current non-fleet class of the automobile are input via this input screen.

Figure 10:
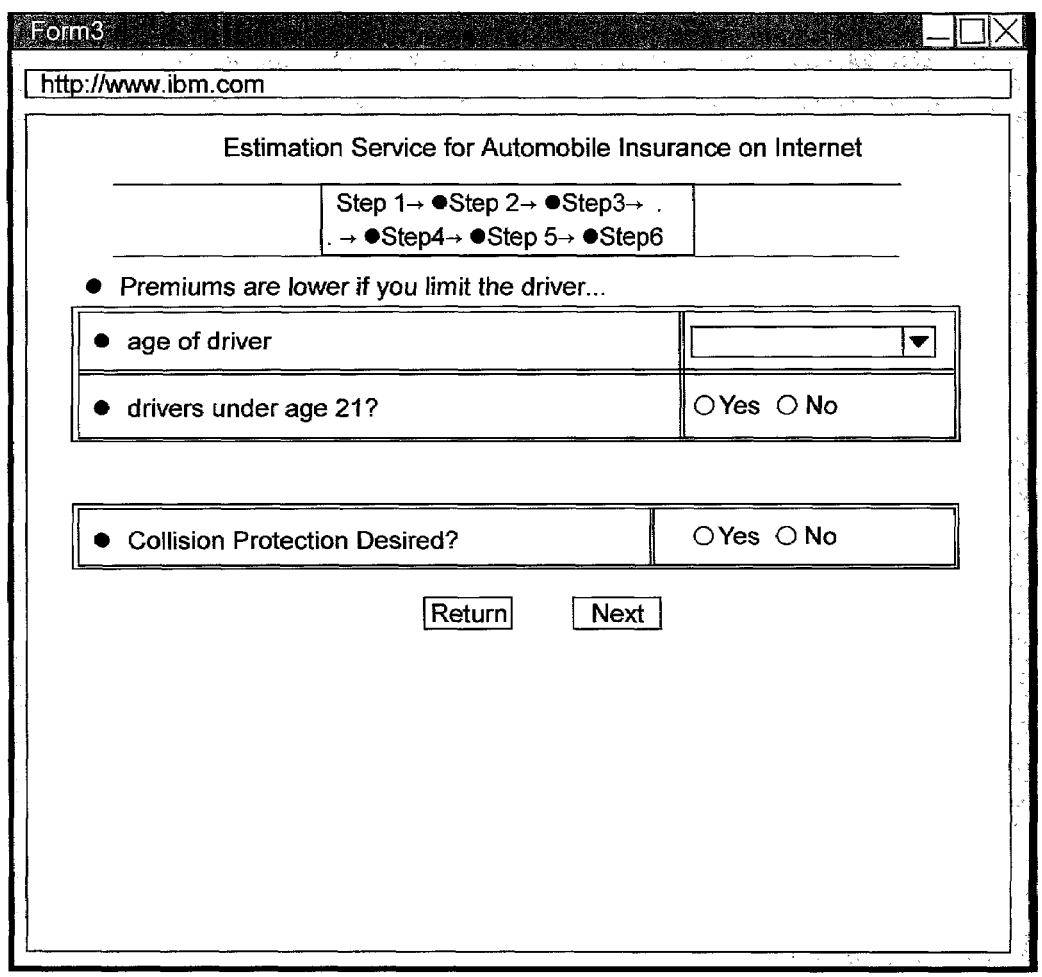
FIG. 10 is an example of an input screen for information about other factors which may effect the premium for automobile insurance.

FIG. 10 illustrates an input screen for information about conditions which may result in lower premiums. In this case, the age the driver, family restriction, and whether collision protection is desired for the automobile.

When the user has finished inputting the data described above, input of trial-calculation conditions (Step 102) is completed. The input trial-calculation condition data is transmitted to the server 1 of the service underwriter (Step 103). In the flowchart in FIG. 3, the input of these trial-calculation conditions and transmission of data are indicated as a single step. In the preferred embodiment, however, the input and transmission of condition data are performed a plurality of times, as described relative to FIGS. 4 to 10.

Next, an insurance company (insurance underwriter) selection screen is sent from the service underwriter to the user (Step 104). FIG. 11 shows a display screen of an example of an insurance provider selecting screen. In this case, six companies A to F are displayed as prospective comparison destinations. The user selects a comparison destination by selecting a check button 20 associated with the desired comparison destinations (Step 105).

In FIG. 11, a selection of insurance policies having, for example, different coverages and deductibles, are extracted from the user input trial-calculation condition data and simultaneously displayed. The user issues the actual request for an estimate by selecting a next button 21. (Step 106). The trial-calculation condition data (including selection items) transferred between the computer 2 of the user serving as a client and server 1 of the service underwriter is preferably entirely controlled and held by the server 1 of the service underwriter as a part of session information. Though the format of the data to be stored is optional, it is possible to use a method of not specifying a format, a method of holding the data in the form of a database, a method of holding the data by converting the data into a format which can be easily handled by the standard format to be described later, and the like. When all inputs and selections are completed and the user selects the estimate (trial-calculation) request button, the server 1 of the service underwriter processes the stored trial-calculation condition data into the standard format for supplying the data to insurance underwriters' computers 7, 8, and 9 (Step 107, to be discussed later), generates an HTML document to be displayed on the frame of the user's browser screen of this embodiment by using the data (such as address (URL) information) about selected comparison destinations (insurance underwriters) held by the server 1 together with the trial-calculation condition data, and transmits the document to the user serving as a client as trial-calculation result display data (Step 108, to be discussed later).

First, the service underwriter converts the trial-calculation condition data received from the user into a format suitable to a common interface serving as the standard format (Step 107). However, this step is not indispensable for a trial-calculation system not using a CGI and therefore, it is also allowed to use a common format other than the CGI. The converted trial-calculation condition data is the input data to be posted to the CGI of an insurance underwriter to be described later and formatted in, for example, "x-form-encoded" format.

The "x-form-encoded" format is a format constituted by connecting "name" and "value" of data by "=" and connecting "name=value" by a pause "&". FIG. 12A is an example of trial-calculation condition data formatted in accordance with the x-form-encoded format. In FIG. 12A, "siki" is a data name (name) showing insurance start and "19991223" is the value of date (year, month, day) shown in accordance with the "YYYYMMDD" format (value). Moreover, insurance expiration (manki) and type, trial calculation (shubetu) and the like can be exemplified. Thus, by converting trial-calculation condition data into a format suitable for a common interface, an insurance underwriter can join a trial-calculation system of the present invention only by generating a CGI (common interface) suitable for the format while a service underwriter does not have to construct a system suitable for the data format for each insurance company (insurance underwriter). Therefore, it is possible to easily construct a high-convenience system for a user at a low cost.

Then, the service underwriter embeds the converted trial-calculation condition data and comparison-destination data in the frame of a display screen to send trial-calculation result display data to the computer of a user (Step 108). The description (REFRESH TIME=0 designation on META tag/ POST designation on Form tag, etc.) of posting the above trial-calculation condition data to URL/CGI designated without an action of a user (automatically) is included in the trial-calculation result display data (HTML document) about the frame of each insurance underwriter as simple code written in a language such as JavaScript. As a result, it is possible to make the computer of a corresponding insurance underwriter automatically execute an estimate request from each user.

FIG. 13 is a display screen showing an example of an estimate result display screen. The screen shows a navigation frame screen and frame screens displaying estimates results from three selected companies. At this stage, however, results are not displayed in frames assigned to companies A, B, and C in FIG. 13.

The computer of a user receiving display screen data sends the trial-calculation condition data embedded in the frame to the address of an insurance underwriter in each frame (Step 109). Because the data is automatically sent, the user does not have to recognize the data.

The trial-calculation condition data sent to the insurance underwriter is posted to the CGI of the insurance underwriter's computer and delivered to the trial-calculation engine of the insurance underwriter through the CGI. In this case, the trial-calculation engine functions as a gateway. The trial-calculation engine receiving the data executes a trial calculation (Steps 110a to 110c) and the trial-calculation result is delivered to the CGI. In this case, the trial-calculation engine can use an existing program intrinsic to each insurance company. The CGI returns the trial-calculation result to the posting source of the data, that is, each frame of the display screen displayed on the user's computer and the returned trial-calculation result is displayed in each frame (Step 111).

FIG. 12B is a data list showing an example of a format of the trial-calculation result data to be returned. The trial-calculation result data is returned to a posting source in accordance with, for example, a "Content-Type: text/plain" format. The format of the data is a format of enclosing a value with double quotations (") and delimiting the format with a line-feed code (0×0a). In the case of the data to be returned, the data name is omitted and values are set in order of data to be posted and are returned.

These trial-calculation results are independently returned for each insurance underwriter starting with an underwriter completing a trial calculation. Because a return destination is a frame displayed on the display screen of a user, trial-calculation results are displayed on the screen of the user in the order in which trial-calculation results are received. Though the display timing is preferably asynchronous, it is also possible to synchronize the timing. FIG. 13 is a display screen showing a result display screen on which trial-calculation results of companies are displayed. The trial-calculation result of the company A is displayed on the frame 22 of the company A, that of the company B is displayed on the frame 23 of the company B, and that of the company C is displayed on the frame 24 of the company C.

Thus, according to this embodiment, trial-calculation results from a plurality of companies are displayed so that the results can be easily compared and examined in accordance with one-time trial-calculation condition input or a series of trial-calculation condition inputs and therefore, it is possible to provide a system and a trial-calculation method with a high convenience of a user. Moreover, according to this embodiment, each trial-calculation result shows the data directly obtained from each insurance company each time. Therefore, it is possible to provide a system and a method for quickly displaying the latest information. Moreover, in the case of this embodiment, converted trial-calculation condition data is directly sent from a user to an insurance underwriter and trial-calculation results are directly returned from the insurance underwriter to the user without being stored in a service underwriter computer. Thus, by providing a system for exchanging data without going through a service underwriter, it is possible to simplify the system.

Then, the trial-calculation results are printed and output on a sheet when requested by the user. By pressing the button 25 for generating a comparison table in the navigation frame in FIG. 13, a printing request is issued (Step 112). The server 1 of a service underwriter accepting the printing request lays out the comparison table shown in FIG. 14 (Step 113). The above operation can be performed by requesting execution of generation of an HTML document for print-output to a server from a client in accordance with the description of JavaScript incorporated into the HTML of, for example, a navigation frame. The laid-out comparison table (trial-calculation result comparison table) is formed in accordance with a format in which trial-calculation conditions (estimate conditions) and trial-calculation contents of companies can be compared. Thereby, the user can obtain visible print-outputs and easily compare and examine insurance commodities. The comparison table (trial-calculation result comparison table) is displayed on the display screen of the user and print-output to the printer 6 in accordance with selection by the user (Step 114).

Thus, the trial-calculation method of this embodiment is completed. It is needless to say that the above print output is optional and it is not an indispensable requirement of the present invention.

The invention made by the present inventor is specifically described in accordance with an embodiment of the present invention. However, the present invention is not restricted to the embodiment. Various modifications of the present invention are allowed as long as the modifications do not deviate from the gist of the present invention.

For the above embodiment, a case is described in which the sending of trial-calculation condition data and the returning of trial-calculation result data are performed between a user and an insurance underwriter. However, as shown in FIG. 15, it is also allowed to send trial-calculation condition data from a service underwriter to an insurance underwriter (Step 120), temporarily store a trial-calculation result sent from the insurance underwriter in the computer of the service underwriter, and then send result display data to the computer of a user from the service underwriter in a form of embedding a trial-calculation result (Step 121). Moreover, for the above embodiment, a case is described in which divided frames are arranged in a single window in parallel. However, it is also allowed to generate a plurality of other windows and display trial-calculation results in the windows one each.

Moreover, for the above embodiment, an automobile insurance commodity is described. However, it is needless to say that when the same insurance commodity is provided from a plurality of insurance companies, the present invention can be applied to other insurance commodities. Furthermore, it is possible to apply the present invention to the same kind of commodity and service charge estimates from a plurality of companies in addition to an estimate of a premium.

Furthermore, for the above embodiment, a system and a method are mainly described. However, because a computer-readable program realizes the function of the system and the method, it is clear that a recording medium in which the computer-readable program is recorded is disclosed in the embodiment. It is a matter of course that the medium includes not only a medium built in a memory device such as a hard disk but also a medium to be traded separately from a memory device such as a CD-ROM, DVD-ROM, flash memory, or floppy disk.

The following matters are disclosed about a configuration of the present invention as a summary.

A method is provided for displaying a trial-calculation result of a quote using a computer system and/or computer network. The method comprises the steps of displaying an input screen for prompting input of a trial-calculation condition and selection of one trial-calculation underwriter or a plurality of trial-calculation underwriters requesting trial calculation of the charge on the display unit of a computer system of the user in response to a request of the user; generating the display data for displaying trial-calculation results on the display unit of the user in accordance with the trial-calculation condition data input to the input screen and the identification data for specifying the computer system(s) of the trial-calculation underwriter(s) selected on the input screen; and making the computer system(s) of the selected trial-calculation underwriter(s) execute trial calculation(s) and displaying the trial-calculation result(s) on the display unit of the user in response to a trial-calculation execution request of the user.

The a plurality of trial-calculation results sent from the plurality of trial-calculation underwriters may be displayed on the same display screen or output to one printing sheet so that the results can be compared.

A frame for each of the trial-calculation underwriters may be assigned to the display data for displaying the trial-calculation result(s) on the display unit and the address data of the trial-calculation underwriters for sending the trial-calculation condition data is related to the frame as identification data.

An calculation system using a computer system and/or a computer network is also provided. The system comprises, a unit for displaying an input screen for prompting input of a trial-calculation condition and selection of one trial-calculation underwriter or a plurality of trial-calculation underwriters requesting trial calculation of the charge on the display unit of a computer system of a user in response to a request of the user; a unit for generating the display data for displaying trial-calculation result(s) on the display unit of the user in accordance with the trial-calculation condition data input to the input screen and the identification data for specifying the computer system(s) of the trial-calculation underwriter(s) selected on the input screen; and a unit for making the computer system(s) of the selected trial-calculation underwriter(s) execute trial calculation(s) and display trial-calculation result(s) on the display unit of the user in response to a trial-calculation execution request of the user.

The plurality of trial-calculation results sent from the trial-calculation underwriters may be displayed on the same display screen or output to a printing sheet so that the results can be compared.

A frame for each of the trial-calculation underwriters may be assigned to the display data for displaying the trial-calculation results on the display unit and the address data of the trial-calculation underwriters for sending the trial-calculation condition data is related to the frame as identification data.

The following are advantages obtained from typical aspects of the present invention disclosed in this description. It is possible to compare and examine insurance commodities of a plurality of companies by inputting a single trial-calculation condition. Moreover, because pieces of insurance commodity information are directly supplied from a plurality of companies, it is possible to provide up-to-date commodity information and rate quote. Furthermore, it is possible to provide high-quality insurance-commodity information by a comparatively simple system.

What is claimed is:

1. In a computing environment, a method for providing a user with an estimate of an insurance premium for an insurance product from at least one insurance provider, comprising the steps of:

transmitting one or more condition input screens from a service computer of a service underwriter to a user's computer of the user;

displaying the one or more condition input screens for prompting input from the user of conditions which may effect the insurance premium;

displaying an insurance provider selection screen for prompting the user to select one or more insurance providers to which to submit a request for the insurance premium estimate;

receiving the conditions input by the user at the service computer;

converting the conditions input by the user into a standard format suitable to a common interface, wherein the converting step is performed by the service computer;

embedding by the service computer an address of a web site of each selected insurance provider in data used for subsequently displaying the received insurance premium estimates on a display unit of the user's computer;

receiving, by the user's computer from the service computer, the converted conditions input having a standard format and the embedded address of a website of each selected insurance provider;

after the embedding step and after the step of receiving the converted conditions input and the embedded address of a website of each selected insurance provider, sending the conditions input in the standard format to the one or more insurance providers selected by the user, wherein the sending step comprises directly sending the conditions input in the standard format from the user's computer to the selected insurance providers such that the conditions input in the standard format sent from the user's computer does not pass through or interact with the service computer while being transmitted from the user's computer to the selected insurance providers;

generating a display for displaying premium estimates results on the display unit in accordance with the conditions input by the user and the one or more insurance providers selected by the user;

receiving the insurance premium estimate from each of the selected insurance providers, said premium estimates having been calculated by the selected one or more insurance providers based on the conditions input, wherein the receiving step comprises directly receiving, by the user's computer, the insurance premium estimates from the selected insurance providers such that the insurance premium estimates received by the user's computer from the selected insurance providers does not pass through or interact with the service computer while being transmitted from the selected insurance providers to the user's computer; and displaying the received premium estimates on the display unit based on the embedded address of the website of each selected insurance provider.

2. The method of claim 1, wherein the selected insurance providers comprise a plurality of insurance providers, and wherein the calculated premium estimates from the selected insurance providers are simultaneously displayed in separate frames on a single display screen.

3. The method of claim 1, wherein the common interface is a common gateway interface (CGI).

4. The method of claim 1, further comprising printing the received premium estimates.

5. The method of claim 1, wherein the sending step is performed by a browser at the user's computer, the wherein the service computer is coupled to the user's computer by a network, and wherein the selected insurance providers are coupled to the user's computer by the network.

6. The method of claim 5 wherein the network is the Internet.

7. The method of claim 5 further comprising generating conditions input data for said displaying one or more condition input screens, wherein said generating conditions input data is performed by the service computer.

8. The method of claim 5 further comprising generating insurance provider input data for said displaying the insurance provider selection screen, wherein said generating insurance provider input data is performed by the service computer.

9. The method of claim 1, wherein the selected insurance providers comprise at least two insurance providers, and wherein the receiving step comprises receiving the insurance premium estimates from each selected insurance provider in accordance with a timing that is asynchronous with receiving the insurance premium estimates from each other selected insurance provider.

10. The method of claim 1, wherein the selected insurance providers comprise at least two insurance providers, and wherein the receiving step comprises receiving the insurance premium estimates from each selected insurance provider in accordance with a timing that is synchronous with receiving the insurance premium estimates from each other selected insurance provider.

11. In a computing environment, a system for calculating estimates to a user for an insurance product from at least one insurance provider:
    means for transmitting one or more condition input screens from a service computer of a service underwriter to a user's computer of the user,
    first means for prompting the user on said one or more condition input screens to input, via the user's computer, conditions input of conditions relevant to calculation of
    an insurance premium estimate for an insurance policy;
    means for receiving the conditions input by the user;
    second means for prompting the user to select, via the user's computer, one or more insurance providers from which the insurance premium estimate is desired;
    means for converting the conditions input by the service computer into a standard format suitable to a common interface;
    means for sending the conditions input in the standard format from the user's computer to the selected one or more insurance providers via a network, wherein said means for sending comprises means for directly sending the conditions data in the standard format from the user's computer to the address of the web site of each selected insurance provider;
    means for automatically receiving calculated insurance premium estimates from the selected insurance providers at the user's computer for display on a display unit of the user's computer;
    means for embedding by the service computer, prior to sending the conditions input in the standard format from the user's computer to the selected one or more insurance providers via the network, an address of a web site of each selected insurance provider in data used for displaying the received insurance premium estimates on the display unit;
    means for receiving, by the user's computer from the service computer, the converted conditions input having a standard format and the embedded address of a website of each selected insurance provider; and
    means for displaying the received premium estimates on the display unit based on the embedded address of the website of each selected insurance provider.

12. The system of claim 11 wherein the selected insurance providers comprise a plurality of insurance providers, and wherein the calculated premium estimates from the selected insurance providers are simultaneously displayed in separate frames on a single display screen.

13. The system of claim 11 further comprising third means for prompting the user to select an insurance product for which an estimate is desired.

14. The system of claim 11 wherein the service computer generates data for said first and second prompting means and sends the data to the user's computer via the network in response to a request from the user's computer.

15. The system of claim 11 wherein the network is the Internet.

16. The system of claim 11, further comprising means for printing the received premium estimates.

17. The system of claim 11 wherein the common interface is a common gateway interface (CGI).

18. The system of claim 11 wherein the service computer is coupled to the user's computer by the network, and wherein the selected insurance providers are coupled to the user's computer by the network.

19. The system of claim 11 further comprising means for generating, by the service computer, conditions input data for use by said first means for prompting the user to input the conditions input.

20. The system of claim 11, further comprising means for generating insurance provider input data generating, by the service computer, for use by said second means for prompting the user to select the one or more insurance providers.

* * * * *